Dec. 10, 1963 J. O. SCHROEDER 3,114,004

RADIO SIGNAL RECEIVERS

Filed March 1, 1962

2 Sheets-Sheet 1

INVENTOR.

JOHN O. SCHROEDER

BY

Eugene M. Whitacre

ATTORNEY

INVENTOR.
JOHN O. SCHROEDER
BY Eugene M. Whitacre
ATTORNEY

United States Patent Office 3,114,004
Patented Dec. 10, 1963

3,114,004

RADIO SIGNAL RECEIVERS

John O. Schroeder, Hamilton Square, N.J., assignor to Radio Corporation of America, a corporation of Delaware Filed Mar. 1, 1962, Ser. No. 176,700
6 Claims. (Cl. 179—15)

The present invention relates to stereophonic multiplex radio signal receivers, and more particularly to compatible stereophonic multiplex frequency-modulation (FM) radio receivers which operate in response to either monophonic or stereophonic signal information on a single modulated carrier wave.

In such receivers, under the presently accepted method of broadcasting, the carrier wave is frequency-modulated by the sum of two modulating audio-frequency signals, such as two stereophonically-related left (L) and right (R) signals, as a single modulating signal in the usual manner for FM broadcast and compatible reception by existing monophone receivers. However, in the multiplex system, the carrier wave further is simultaneously provided with stereophonic information effective for signal separation, in the form of a modulating suppressed carrier subcarrier signal which is amplitude-modulated with the difference of the two stereophonically-related signals to be transmitted, and a pilot signal for use in demodulating the suppressed carrier signal.

The compatible composite stereophonic signal at the multiplex output circuit or terminal of the frequency-modulation detector of the multiplex receiver may thus be composed of the main frequency-modulation signal component, which is the compatible signal used by an unmodified monophonic frequency-modulation receiver, a 19 kc. (kilocycles per second) pilot signal, and the difference-frequency, $(L-R)$ signal that is an AM double-sideband suppressed-carrier signal at 38 kc.

There are many existing frequency-modulation receivers in use that can be or are arranged for adaptation to stereophonic signal translation and reproduction by the provision of multiplex signal output connection means at the frequency-modulation detector. A stereophonic multiplex unit for separating and deriving the two stereophonically-related signals from a compatible stereophonic signal is thus desirable and can be made integral with and part of new receivers or applied as an adaptor unit to existing receivers.

In existing systems, the compatible composite stereophonic signal at the multiplex output circuit or terminal of the frequency-modulation detector, as hereinbefore referred to, is applied to the stereo multiplex unit which operates to separate the subcarrier or stereophonic information with suitable filter means after which the difference $(L-R)$ component is demodulated. By suitable matrix circuitry which follows, the demodulated subcarrier signal $(L-R)$ is subtracted from and added to the sum signal $(L+R)$ component to obtain separate stereophonically-related or L and R signals.

In the demodulation of the subcarrier sidebands it is the usual practice to separate the 19 kc. pilot signal from the remainder of the composite signal, double its frequency to 38 kc., and apply the 38 kc. to the subcarrier detector along with the subcarrier sidebands to derive the $(L-R)$ modulation.

It is an object of this invention to provide an improved subcarrier detector circuit for FM stereophonic receivers.

Another object of this invention is to provide an improved subcarrier detector for stereophonic FM receivers which uses the 19 kc. pilot signal directly in the demodulation of the subcarrier sidebands, thereby avoiding the necessity of additional circuit elements for doubling the pilot signal frequency to 38 kc.

In accordance with the invention, the subcarrier detector includes a balanced input circuit for a demodulating or switching signal which is derived from, and at the frequency of, the pilot signal. A first pair of series connected diodes and a resistance-capacitance network whose time constant is long relative to the frequency of the pilot signal is coupled across the balanced input circuit to conduct for one polarity of the switching signal. A second pair of series connected diodes and a second resistance-capacitance network whose time constant is substantially the same as that of the first network is coupled across the balanced input circuit to conduct for the opposite polarity of the switching signal.

Circuit means providing a source of subcarrier sideband signals to be detected, and an output impedance element for said detector are effectively connected in series between balanced points in said input circuit and in said first and second resistance-capacitance network.

In accordance with one embodiment of the invention, the circuit may be considered as a balanced bridge with the demodulating signal at the pilot signal frequency across one diagonal of the bridge. When the bridge is balanced very little of the 19 kc. demodulating signal appears across the opposite diagonal of the bridge in which the output impedance element appears. Furthermore, since the time constant of the resistance-capacitance networks is long relative to the frequency of the pilot signal, the diode circuits operate as peak detectors having a small conduction angle. Thus, the diodes appear as open circuits except during the sampling periods so that the sideband energy is effectively blocked from appearing across the output circuit. The demodulated signal voltage developed across the output circuit approximates a step function of the sideband envelope, so that there is very little harmonic distortion resulting from the detection process.

The novel features which are considered to be characteristic of this invention are set forth with particularity in the appended claims. The invention, itself, however both as to its organization and method of operation will best be understood from the following description when read in connection with the accompanying drawing in which:

Figure 1:
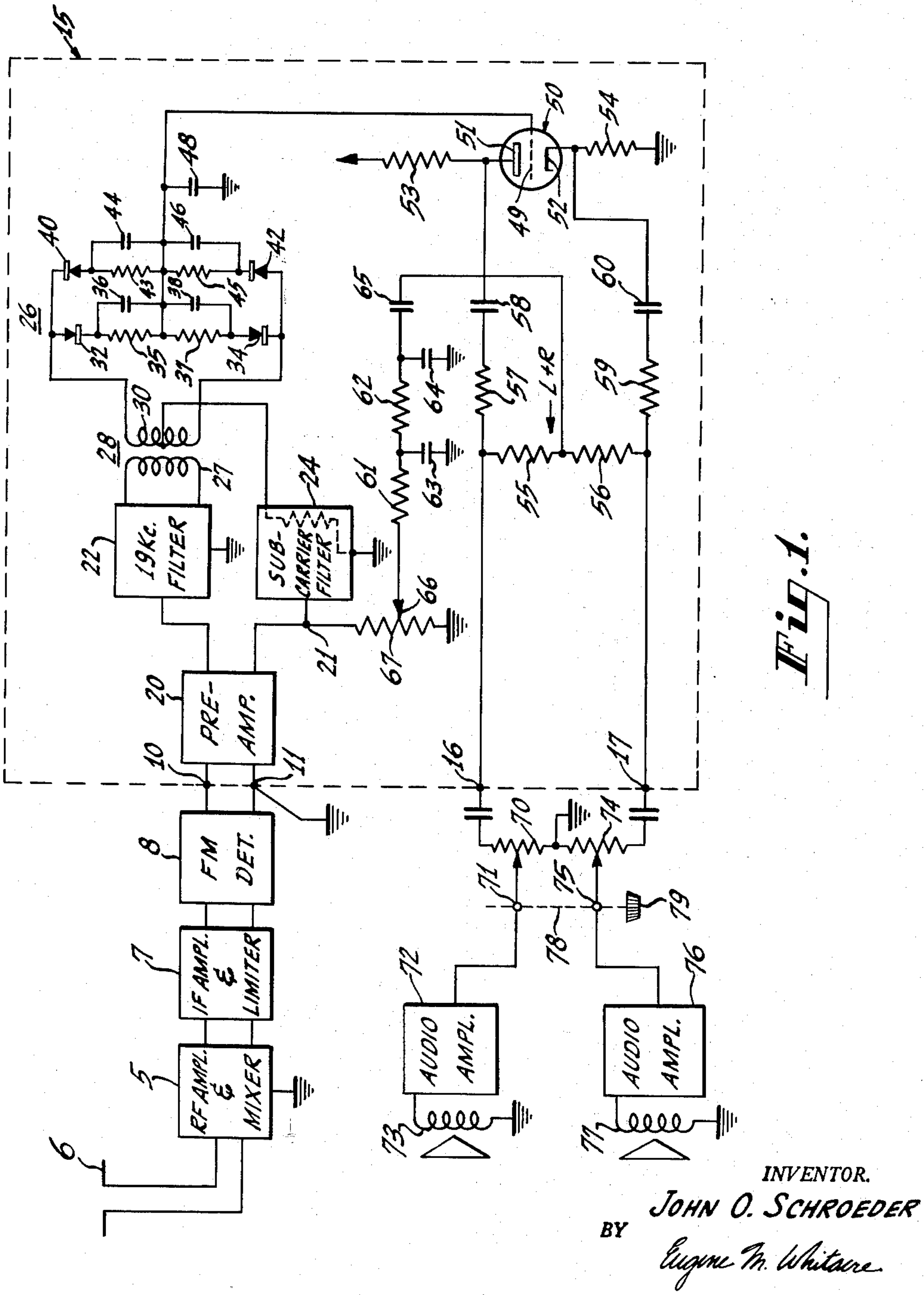
FIGURE 1 is a schematic circuit diagram partly in block form, of an FM stereophonic receiver including a multiplex subcarrier demodulator embodying the invention.

Referring to the drawings and more particularly to FIGURE 1 the receiver circuit shown in block form is representative of any frequency modulation receiver which may be adapted for stereophonic multiplex operation. In this respect it is provided with the usual R-F amplifier and mixer 5 tunable through the frequency-modulation band of 88 to 108 mc., and coupled to antenna means 6 and the usual I-F amplifier and limiter 7 which is followed by a suitable FM detector 8. The FM detector 8 includes a pair of output terminals 10 and 11 across which are developed the main channel or $(L+R)$ signals, the subcarrier sidebands representative of the $(L-R)$ signal, and the 19 kc. pilot tone.

Connected with the multiplex output circuit or terminals 10—11 of the FM detector 8 is a stereophonic multiplex and matrix unit 15 for deriving two stereophonically-related (L and R) or like modulation signals from the composite signal at the FM detector output terminals. This unit may be added to existing receivers, or may be built integrally therewith during manufacture, and provides, at two stereo or channel output terminals 16 and 17, the separated modulation component signals such as the L and R stereo signals in the present example.

In the stereophonic multiplex and matrix unit 15, a signal preamplifier stage 20 is connected to amplify the signals applied thereto from the FM detector 8. The preamplifier 20 has a pair of output circuits indicated as a 19 kc. filter circuit 22 and a subcarrier filter circuit 24. The subcarrier filter circuit 24 is connected to receive the composite detected signal which appears at the terminal 21, and is operative to pass those signals in a range of frequencies between 23 to 53 kc. to a subcarrier detector 26. If desired, the subcarrier filter 24 may attentuate the subcarrier sidebands on either side of 38 kc. at a rate such that the resultant $(L-R)$ signal from the subcarrier detector 26 will be deemphasized at the rate of 75 microseconds. Alternatively, if desired, deemphasis may be affected after detection of the subcarrier signal. In the present circuit deemphasis is effected prior to detection in the subcarrier filter 24.

The 19 kc. filter 22, may for example, comprise a resonant circuit tuned to 19 kc. connected to the output electrode of the preamplifier 20. If desired or necessary to produce a sufficiently strong switching signal, the filter 22 may include provision for amplifying the pilot signal. The separated 19 kc. pilot signal is then developed across primary winding 27 of an output transformer 28, the secondary winding 30 of which is coupled to the subcarrier detector circuit 26.

The secondary winding 30 of the transformer 28 has a center tap which is connected to the subcarrier filter 24 to receive the subcarrier sideband signals. A first pair of diodes 32 and 34 are connected across the secondary winding 30 and are poled to conduct for one polarity of the 19 kc. switching voltage. A second pair of diodes 40 and 42 are connected in series across the secondary winding 30, and are poled to conduct for the opposite polarity of the 19 kc. switching voltage.

The cathode of the diode 32 is connected to the anode of the diode 34 through a pair of resistors 35 and 37 which are respectively paralleled by the capacitors 36 and 38. In like manner, the cathode of the diode 42 is connected to the anode of the diode 40 through a pair of resistors 43 and 45 which are respectively paralleled by the capacitors 44 and 46. The time constant of each of the four parallel resistance-capacitance networks is substantially the same, and is long relative to the pilot signal frequency so that the diodes act as peak detectors. If the resistors 35, 37, 43 and 45 are equal, then no D.-C. voltage is developed across the output capacitor 48 as a result of rectification of the 19 kc. switching signal.

Demodulated subcarrier sideband signals $(L-R)$ are developed across the capacitor 48 and applied to the control grid 49 of a triode tube 50 which is connected as a phase splitter. The tube 50 includes an anode 51 and a cathode 52 which are connected respectively through load impedance elements 53 and 54 to the operating potential supply source +B, and to ground.

A matrix network including a pair of series connected resistors 55 and 56 are coupled to receive opposite phases of the $(L-R)$ signal from the phase splitter stage 50. One end of the resistor 55 is coupled to the anode 51 through an isolating resistor 57 and a coupling capacitor 58 to receive the $+(L-R)$ signal, and one end of the resistor 56 is coupled to the cathode 52 through an isolating resistor 59 and a coupling capacitor 60, to receive the $-(L-R)$ signal.

The $(L+R)$ signal, derived from the preamplifier 20, is applied between the junction of the resistors 55 and 56 and ground. The pilot signal and subcarrier sidebands as well as other high frequency components which may be present at the output of the preamplifier 20 are effectively removed by the high frequency deemphasis circuit comprising the series resistor 61 and 62 and the shunt capacitors 63 and 64. The time constant of this deemphasis network, taking into account the loading by the resistors 55 and 56 is approximately 75 microseconds. The deemphasis network for the $L+R$ signals is coupled to the matrix network by way of a coupling capacitor 65. The $(L+R)$ signal adds to the $+(L-R)$ and $-(L-R)$ signals respectively to produce the left and right stereophonic signals at the terminals 16 and 17 respectively. Adjustment of the tap 66 on the variable resistor 67 provides the proper amount of $(L+R)$ signal to the matrix circuit so that the addition and subtraction of the $(L+R)$ and $(L-R)$ signals produces the proper signal output of the terminals 16 and 17.

The radio receiver signal translating system includes suitable means connected with the terminals 16 and 17 of the stereo multiplex unit to amplify and reproduce the two channel signals, which are here assumed to be the left and right, or L and R, audio-frequency signals which are stereophonically-related. To this end, the terminal 16 is connected to system ground through an output volume-control potentiometer resistor 70 having an output volume control contact 71 connected with a suitable audio frequency channel amplifier 72 as indicated, which has a common ground return connection and is connected to drive a left-channel output loudspeaker 73.

Likewise the output terminal 17 is connected to system ground through a second channel volume-control potentiometer resistor 74 having an output volume control contact connected to the second channel amplifier means 76, having a common ground return connection and a right channel output loudspeaker 77 connected therewith as shown. As is customary, the volume-control means are gang-connected for joint operation as indicated by the dotted line connection 78 and the common volume control knob represented at 79 in connection therewith. This dual-channel signal translating circuit and sound-reproducing output means therefor is representative of any suitable means of this type, normally provided in a stereophonic sound reproducing system.

Figure 2:
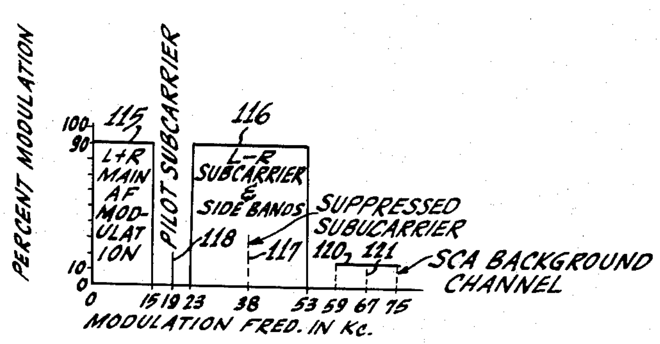
FIGURE 2 is a graph indicating the range of frequency spectrum and modulation components of a composite modulation signal as applied to the stereophonic multiplex unit of the circuit of FIGURE 1, with reference to certain operating features of the invention.

Referring now to FIGURE 2 along with FIGURE 1, the operation of the multiplex unit in the receiver may now be considered. The composite signal at the multiplex output terminals 10—11 of the FM detector 8 when the receiver is responding to compatible stereophonic signals, may be represented by the graph of FIGURE 2 drawn with reference to the FM carrier modulation frequency in kilocycles along the X axis and percentage modulation along the Y axis which also indicates relative amplitudes of subcarrier signals. It will be seen that the total signal is composed of an (L+R) component 115 which may provide as much as 90% modulation and an (L—R) double-sideband suppressed-carrier AM signal component 116 which may also modulate the carrier up to 90% as indicated, but 180° out of phase with the modulation provided by the main modulation component 115. In other words when the component 115 is maximum the component 116 is minimum.

In the graph of FIGURE 2, it is assumed that the audio-frequency modulation will extend from zero to 15 kc. As a practical matter it is known that the modulation frequency actually may extend between 50 cycles and slightly less than 15 kc., depending upon the fidelity of the studio equipment used for modulating the system. The suppressed-carrier signal indicated by the dotted line 117 is at 38 kc. and is the second harmonic of the pilot carrier represented at 118 with a frequency of 19 kc. The sidebands of the suppressed subcarrier extend substantially from 23 kc. to 53 kc. as indicated, thereby to provide for substantially the full 15 kc. modulation referred to.

The possible SCA background music channel is indicated by the block 120 and extends 7.5 kc. on either side of a 67 kc. subcarrier signal indicated by the dotted line 121.

When a stereophonic FM signal is being received by the FM receiver, a composite signal as represented in FIGURE 2 is developed across the output terminals of the FM detector 8. The resultant signal is amplified in the stage 20, with the 19 kc. pilot signal being developed in the filter circuit 22 and the composite signal at the terminal 21.

The 19 kc. output voltage from the filter 22 and the subcarrier sidebands from the filter 24 are applied to the balanced synchronous peak detector 26 to derive the original (L—R) signal information.

The balanced synchronous peak detector 26 provides a high ratio of desired audio to spurious frequency output with no additional filtering requirements. To understand the operation of the detector 26 ignore for the moment the subcarrier sideband connections and assume that the center tap of the winding 30 is grounded, and that only the 19 kc. oscillator voltage is applied to the diodes 32–34 and 40–42. Assuming no diode losses, the cathode voltage of diodes 32 and 42 will after several cycles of input voltage, reach a positive D.-C. level which corresponds to the peak value of the applied input voltage since the time constants of the four resistor-capacitor networks are long compared to the period of the 19 kc. input source. Under these conditions, the diodes 32–42 current flows for a very few degrees of each cycle, or in other words the diodes represent an open circuit except for the brief time of conduction. The conduction angle can be controlled by selection of the amplitude of the 19 kc. voltage and the values of the resistor-capacitor networks. The diodes 34–40 operate in exactly the same manner as described above except that the D.-C. voltage at the anodes of these diodes is negative but equal to the positive voltage developed at the cathodes of the diodes 32 and 42.

Since there are equal and opposite voltages at the remote ends of the resistor capacitor networks 35—36, 37—38, 43—44, and 45—46, and the resistors thereof are of equal value, there is no current flow from, or to the junction of these resistors so there is none at the hypothetically grounded center tap of the winding 30. If a D.-C. voltage is applied between the center tap of the winding 30 and ground, the capacitor 48 will be charged to that level each time one of the diodes conducts, and since there is no discharge path (except through the diodes) this potential will be maintained across the capacitor 48.

Figure 3:
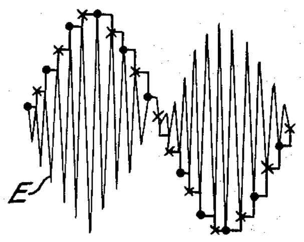
FIGURE 3 is a graph showing the stereophonic sideband information for the cycle of a modulating signal and the demodulated wave resulting therefrom after detection in the subcarrier detector shown in FIGURE 1.

The circuit operates in the same manner when the subcarrier sidebands are applied between the center tap of the winding 30 and ground. With reference to FIGURE 3, the wave form E represents a double sideband suppressed carrier signal which is applied to the center tap of the winding 30. The 19 kc. switching voltage is phased so that the diodes 32 and 34 conduct at the times indicated by the dots and the diodes 40 and 42 conduct at the times indicated by the X's, and the output voltage across the capacitor 48 is a step approximation of the original modulating wave as indicated. It should be noted that the negative portions of the modulating voltage cause the subcarrier sidebands to reverse in phase by 180° with respect to the positive portions of the modulating wave. The resultant step approximation wave form has very little harmonic distortion and the amplitude of the spurious (higher frequency) output components is much less than that of the desired signal, becoming zero when the subcarrier sideband voltage goes to zero. In other words, the detector is balanced with respect to the 19 kc. oscillator switching voltage, so that none of this voltage is applied to the phase splitter 50, and the conduction angle of the four diodes is small enough to prevent the unbalanced subcarrier sidebands and other high frequency components from being applied to the phase splitter.

The subcarrier demodulation and matrixing circuit described is simple and economical to build and adjust as compared to contemporary circuits for accomplishing the same function. The circuit includes a simple and highly efficient subcarrier sideband detector, which provides an audio signal output with very little distortion using the 19 kc. pilot signal as the switching voltage for the subcarrier.

What is claimed is:

1. A subcarrier detector for stereophonic frequency modulation receivers of the type for receiving and detecting a received stereophonic frequency modulation carrier wave to recover a composite signal including subcarrier sideband signals modulated in accordance with one of a pair of stereophonically-related signals, and a pilot signal at half the frequency of said subcarrier, comprising means adapted to be connected to said frequency modulation receiver for separating said pilot signal from the remainder of said composite signal, an input circuit including a center tapped input winding coupled to said separating means, a first and second diodes and first and second resistance-capacitance networks connected in series across said center tapped winding, said diodes being poled to conduct current for one polarity of signals developed across said winding, a third and fourth diodes and third and fourth resistance-capacitance networks connected in series across said center tapped winding, said third and fourth diodes being poled to conduct current for the opposite polarity of voltage across said winding, said first, second, third and fourth networks each having a time constant which is long compared to the frequency of said pilot signal, means connecting the junction of said first and second resistance capacitance networks to the junction of said third and fourth resistance-capacitance networks, means for separating said sideband signals from the remainder of said composite signal, and output impedance means connected in series with said means for separating said sideband signals between the center tap of said winding and the junction of said first and second resistance-capacitance networks.

2. A subcarrier detector of the type adapted to receive subcarrier sideband signals modulated in accordance with a modulating signal and a pilot signal at half the frequency of said subcarrier, comprising the combination of, an input circuit coupled to receive waves at said pilot signal frequency, said input circuit being balanced with respect to ground, first and second diodes and a resistance-capacitance network connected in series across said input circuit, said first and second diodes being poled to conduct current for one polarity of signals developed across said input circuit, third and fourth diodes and a second resistance-capacitance network connected in series across said input circuit, said third and fourth diodes being poled to conduct current for the opposite polarity of voltage across said input circuit, means for applying said sideband signals to said detector between a balanced point in said input circuit and ground, and an output impedance element connected between a point common to said first and second resistance-capacitance networks and ground.

3. A subcarrier detector for stereophonic frequency modulation receivers of the type including a frequency modulation detector for detecting a received stereophonic frequency modulation carrier wave to recover a composite signal including subcarrier sideband signals modulated in accordance with one of a pair of stereophonically-related signals, and a pilot signal at half the frequency of said subcarrier, comprising a means adapted to be connected to said frequency modulation receiver for separating said pilot signal from the remainder of said composite signal, an input circuit which is balanced with respect to a point of referernce potential coupled to said separating means to receive signals of said pilot signal frequency, first and second diodes and a first resistance-capacitance network connected in series across said input circuit, said diodes being poled to conduct current for one polarity of signals across said input circuit, third and fourth diodes and a second resistance-capacitance network connected in series across said input circuit, said third and fourth diodes being poled to conduct current for the opposite polarity of signals across said input circuit, means for separating said sideband signals from the remainder of said composite signal, and output circuit means connected in series with said means for separating said sideband signals between a point in said input circuit and a common point in said first and second resistance-capacitance networks.

4. A subcarrier detector for stereophonic frequency modulation receivers of the type for receiving and detecting a received stereophonic frequency modulation carrier wave to recover a composite signal including subcarrier sideband signals modulated in accordance with one of a pair of stereophonically-related signals, and a pilot signal at half the frequency of said subcarrier, comprising means adapted to be connected to said frequency modulation receiver for separating said pilot signal from the remainder of said composite signal, an input circuit including a center tapped input winding coupled to said separating means to receive signals of said subcarrier frequency, a first diode, a first and second resistors and a second diode connected in series in the order named across said center tapped winding, said diodes being poled to conduct current for one polarity of signals developed across said winding, first and second capacitors connected respectively across said first and second resistors, a third diode, a third and fourth resistors and a fourth diode connected in series in the order named across said center tapped winding, said third and fourth diodes being poled to conduct current for the opposite polarity of voltage across said winding, third and fourth capacitors connected across said third and fourth resistors, means connecting the junction of said first and second resistors to the junction of said third and fourth resistors, means for separating said sideband signals from the remainder of said composite signal connected between said center tap and ground, and output impedance means connected between the junction of said first and second resistors and ground.

5. A subcarrier detector of the type adapted to receive subcarrier sideband signals modulated in accordance with a modulating signal and a pilot signal at half the frequency of said subcarrier, comprising the combination of, an input circuit coupled to receive waves at said pilot signal frequency, said input circuit being balanced with respect to ground, first and second diodes and a resistance-capacitance network connected in series across said input circuit, said first and second diodes being poled to conduct current for one polarity of signals developed across said input circuit, third and fourth diodes and a second resistance-capacitance network connected in series across said input circuit, said third and fourth diodes being poled to conduct current for the opposite polarity of voltage across said input circuit, an output impedance element, an input circuit for subcarrier sideband signals, and means connecting said output impedance element and said input circuit for subcarrier sideband signals in series between a point on said input circuit for waves at said pilot signal frequency and a point common to said first and second resistance-capacitance networks.

6. Subcarrier detector for stereophonic frequency modulation receivers of the type including a frequency modulation detector for detecting a received stereophonic modulation carrier wave to recover a composite signal including subcarrier sideband signals modulated in accordance with one of a pair of stereophonically-related signals, and a pilot signal at half the frequency of said subcarrier, comprising:

means adapted to be connected to said frequency modulation receiver for separating said pilot signal from the remainder of said composite signal, an input circuit which is balanced with respect to a point of reference potential coupled to said separating means to receive signals of said pilot signal frequency, first and second diodes and a first resistance-capacitance network connected in series across said input circuit, said diodes being poled to conduct current for one polarity of signals across said input circuit, third and fourth diodes and a second resistance-capacitance network connected in series across said input circuit, said third and fourth diodes being poled to conduct current for the opposite polarity of signals across said input circuit, means for separating said sideband signals from the remainder of said composite signal, and output circuit means connected in series with said means for separating said sideband signals between a point in said input circuit and a common point in said first and second resistance-capacitance networks.

No references cited.